United States Patent [19]
Li et al.

[11] Patent Number: 5,519,796
[45] Date of Patent: May 21, 1996

[54] GAIN EQUALIZATION USING MONOLITHIC PLANAR WAVEGUIDE GRATING MULTIPLEXER AND DEMULTIPLEXER

[75] Inventors: Chung-Sheng Li, Ossining, N.Y.; Franklin F.-K. Tong, Stamford, Conn.

[73] Assignee: International Business Machines Corporation, Armonk, N.Y.

[21] Appl. No.: 399,276

[22] Filed: Mar. 6, 1995

[51] Int. Cl.$^6$ ............................................. G02B 6/293
[52] U.S. Cl. ............... 385/24; 359/127; 385/14; 385/39
[58] Field of Search ............................. 359/115, 124, 359/127–132; 385/14, 15, 24, 31, 36, 37, 39

[56] References Cited

U.S. PATENT DOCUMENTS

| | | | |
|---|---|---|---|
| 4,166,212 | 8/1979 | Judeinstein | 385/24 X |
| 4,890,893 | 1/1990 | Smoot | 359/124 |
| 5,136,671 | 8/1992 | Dragone | 385/37 X |
| 5,414,548 | 5/1995 | Tachikawa et al. | 359/130 |

*Primary Examiner*—John D. Lee
*Attorney, Agent, or Firm*—Douglas W. Cameron

[57] ABSTRACT

A monolithically integrated equalization optical equalization device having an optical demultiplexer for demultiplexing an optical signal into a number of individual channels and a number of optical connections for connecting the terminals of the demultiplexers to an optical multiplexer. Metallic strips of varying lengths are deposited on the optical connections so that the optical signal is equalized over the channels at the output terminals of the optical multiplexer.

7 Claims, 1 Drawing Sheet

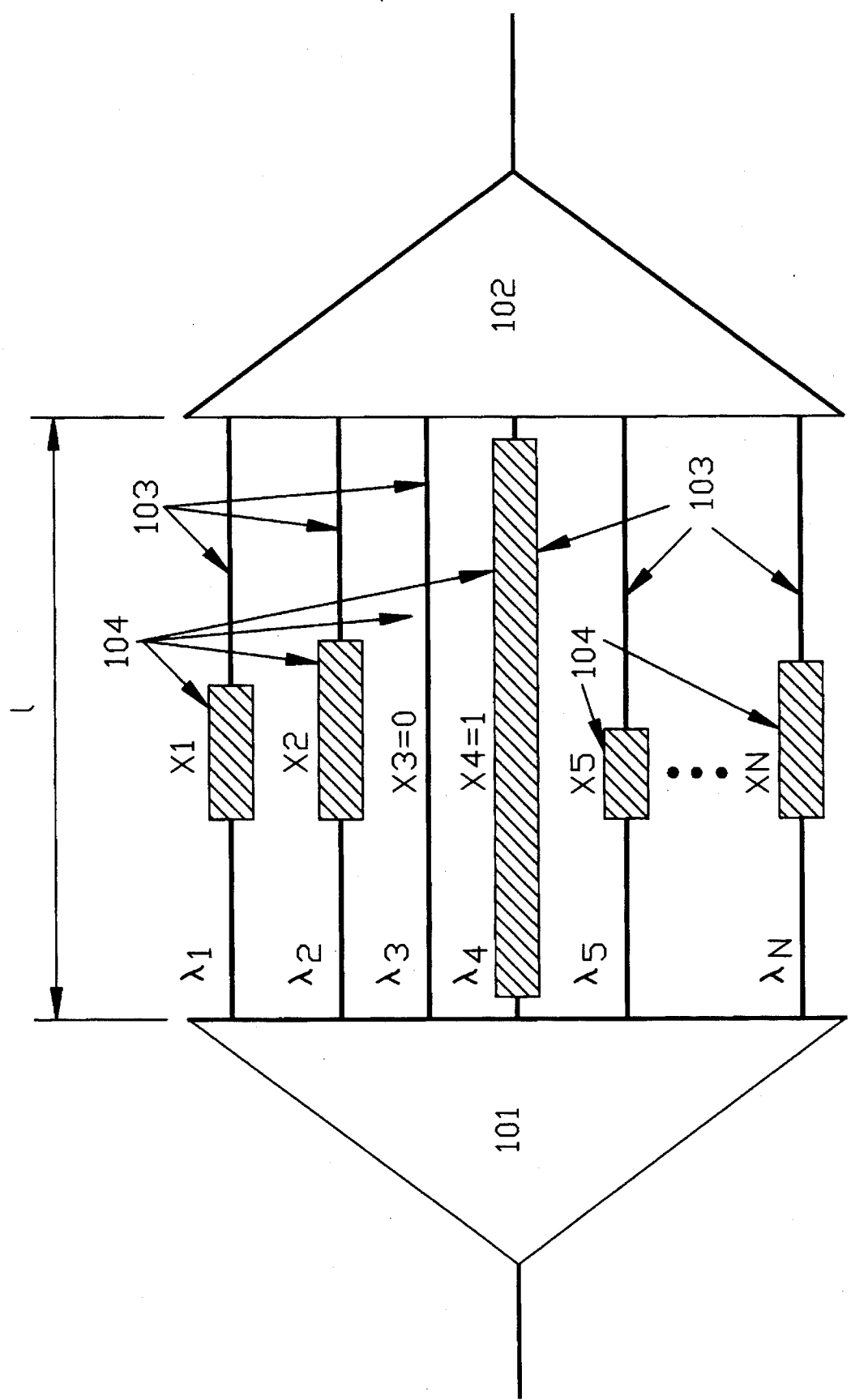

GAIN EQUALIZATION USING MONOLITHIC PLANAR WAVEGUIDE GRATING MULTIPLEXER AND DEMULTIPLEXER

BACKGROUND OF THE INVENTION

1. Field of the Invention

The present invention relates to the gain equalization for optical fibers transmitting optical signals at multiple wavelengths.

2. Description of Prior Art

A metropolitan area network or wide area network (MAN/WAN) using WDMA/WDM has the potential near-far problem where the optical signals originating From different locations experience different attenuation. Furthermore, fibers and optical amplifiers used in such a network also have nonflat transmission spectra and thus different wavelengths experience different gain and attenuation even though they travel through the same physical path. The non-uniform gain of the amplifiers yields different gain factors for different signals distributed across its spectrum. The problem becomes severe as many optical amplifiers are cascaded together. This effect reduces the system margin and may exceed the dynamic range of the detectors. Gain equalization is thus needed.

Most of the existing studies on gain equalization has been focused on equalizing the nonflat gain spectra of the optical amplifiers. Gain equalization using fiber grating embedded in the $Er^{3+}$ fiber amplifier was proposed in [1]. A two-stage amplifier with offset gain peaks was proposed in [2] to dynamically equalize (by means of pump power) the optical signal power among different channels in a WDMA system. This scheme, however, has a very limited equalized bandwidth of approximately 2.5 nm. Gain equalization can also be achieved through controlling the transmission spectra of the optical filters. Using this principle, an equalized 29-channel WDM system spanning 7 nm was demonstrated using a Mach-Zehnder Interferometric filter [3]. Besides not having enough bandwidth, the Mach-Zehnder filter is very difficult to control for proper attenuation. An acousto-optic tunable filter (AOTF) has also been used to equalize gain spectra for a very wide transmission window [4]. Through the injection of multiple RF frequencies with each RF signal transmitting at a different magnitude, an arbitrary transmission characteristic can be established. The resolution of this scheme, however, is limited by the frequency of an AOTF.

Therefore, there is a need for a low cost, wideband, passive, optical device to provide for optical communication over wide area and long haul communication networks.

SUMMARY OF THE INVENTION

It is an object of this invention to provide a low cost, wide band passive optical equalization device to provide for optical equalization over long haul communication networks.

It is the object of this invention to overcome the near-far problem due to the non-equal transmission spectra present in an optical MAN/WAN (Metropolitan Area Network/Wide Area Network) or in an optical long haul transmission system.

It is another object to this invention to provide equalization in the bandwidth range of 30 nm to 50 nm.

It is another object of this invention to maximize the equalized power at the output of the equalizer.

It is yet another object of this invention to minimize the overall physical size of the equalizer.

This invention proposes an equalization scheme using planar gratings with metallic layers deposited on the waveguides to provide equalization. Accordingly, this invention is an optical equalizer for equalizing an optical signal having a number of wavelengths. This invention comprises an optical wavelength demultiplexer for demultiplexing the optical signal into a number of individual channels with each channel being centered at one of the wavelengths. This invention also comprises an optical multiplexer and a number of optical connections for connecting terminal of the multiplexers to terminals of demultiplexers. A plurality of metallic strips of predetermined lengths are then deposited on the optical connections so that the optical signal is equalized over the channels at the output channels of the optical multiplexer.

BRIEF DESCRIPTION OF THE DRAWINGS

FIG. 1 is a schematic illustration of the passive gain equalization device according to the invention.

DETAILED DESCRIPTION OF A PREFERRED EMBODIMENT

In this invention, we propose a fully monolithic integrated photonic circuit based on $SiO_2/Si$ planar waveguide grating demultiplexer, as shown in FIG. 1.

The planar grating (101 and 102) can function both as a demultiplexer (101) and as a multiplexer (102). Even though the planar grating (either the etched grating or the phase array) is the preferred structure for this invention, other structures which could resolve the incoming wavelengths into spatially different locations such as the Mach-Zehnder interferometer. With demultiplexer 101, optical signals of different wavelengths will be diffracted by the grating and focused onto output waveguides designed for particular wavelengths. At a multiplexer (102), reversal of the situation holds. A set of designed wavelengths can be placed at the output waveguides and these wavelength can be combined into a single output through the grating. The invention is a monolithic structure consisting the demultiplexer and multiplexer back to back. Incoming wavelengths will be separated through different paths and combined together as a single output. The process of fabricating optical paths can be found, for example, in [5], which is hereby incorporated herein by reference. To equalize the various signals, a metallic layer (104) will be deposited lithographically along the path of the waveguides (103) Transverse Electric Field (TE and Transverse Magnetic Field TM modes will be attenuated by the metallic layer) in which the optical signals needed to be attenuated. The deposition of a metal layer is typical in VLSI processing, and its technique is taught, for example, in [6], which is hereby incorporated herein by reference. The amount of required attenuation, which can be calculated through system simulation of individual wavelength channels, is determined by the length of the metallic layer ($L_i$).

Other substrates could be used to build the above circuit. For example, a planar waveguide grating based on InP, polymer or $LiNbO_3$ substrate can be used.

The attenuation of the waveguide is determined by the dimensions and the materials of the waveguide. The attenuation of the waveguide with metalization is $\alpha_m$, while the attenuation of the waveguide without metalization is $\alpha$.

The calculation of the attenuation coefficient $\alpha_m$ and $\alpha$ as a function of the width, height, and refractive index of the waveguide is known in the art and can be found, for example, in [7], which is hereby incorporated herein by reference. The total loss, L, of a branch of the waveguide with total length l between the optical multiplexer and the demultiplexer thus equals $$L = \alpha_m x + \alpha(l-x)$$

where x is the length of the metalized segment of the waveguide.

We assume that the signal strength of the $i^{th}$ wavelength channel is $P_i$, and $P \leq \min \{P_i | i=1 \ldots N\}$. Therefore, the additional loss of the $i^{th}$ channel required in order for the output power to be equalized thus equals $\Delta P_i = P_i - P$. Designing such a system is thus equivalent to maximizing P ($P \leq \min \{P_i | i=1 \ldots N\}$) while solving the following N simultaneous equations where $x_i$ is the length of the metallic layer deposited on the waveguide (optical connection) of the $i^{th}$ channel:

$$\begin{aligned} P_i - P &= \alpha_m x_i + \alpha(l - x_i) \\ &= (\alpha_m - \alpha)x_i + \alpha l \end{aligned} \quad i = 1 \ldots N$$

The rationale for the constraint $P \leq \min \{P_i | i=1 \ldots N\}$ is because the optical signal at each wavelength from the optical demultiplexer has to go through a non-zero distance of waveguide and suffer nonzero optical loss. The procedure for solving the above equation is as follows:

find the index I such that $P_I$ is the minimum output power in $\{P_i | i=1 \ldots N\}$, set $x_I = 0$, resulting in $P_I - P = \alpha l$, substituting this into any other equation with $i \neq I$, and solving for x sub i. After the substitution, $$x_i = \frac{P_i - P_I}{\alpha_m - \alpha}$$

find J such that $x_J$ is maximized among $\{x_j | j=1 \ldots N\}$, set $l = x_J$, compute $P = P_1 - \alpha l$ As a numerical example, we assume the following waveguide characteristics: the loss of the waveguide without metalization, $\alpha$, is 0.1 dB/cm while loss of the waveguide with metalization, $\alpha_m$, is 1 dB/cm. We further assume a four-wavelength equalizer with optical power $-16$ dBm, $-17$ dBm, $-15$ dBm, and $-18$ dBm at the output of the optical demultiplexer For wavelength $\lambda_1$, $\lambda_2$, $\lambda_3$, and $\lambda_4$, respectively. Using the procedure outlined above, we have $0.9x_1 + 0.1l = -16 - P$,
$0.9x_2 + 0.1l = -17 - P$,
$0.9x_3 + 0.1l = -15 - P$,
$0.9x_4 + 0.1l = -18 - P$.

Setting $x_4$ to zero, we obtain $-18 - P = 0.1l$. Substituting this into any of the equations above (except the one containing $x_4$), we could obtain the optimal solution:

$x_1 = 2.22$ cm
$x_2 = 1.11$ cm
$x_3 = 3.33$ cm
$x_4 = 0$ cm

The equalized output power for each wavelength is equal to $-18.33$ dB and the total length of the waveguide is 3.33 cm.

Choosing and $X_1 = 0$ and $l = X_J$ allows for both maximum optical power at the output of the equalizer while at the same time permitting the equalizer to be of minimum physical size.

While setting $X_1 = 0$ $X_J l$ is the optimal solution, other solutions to the above equations for $\delta P_i$ are possible.

FIG. 1 illustrates the proposed device for gain equalization.

[1] M. Tachibana, I. Larning, P. R. Morkel, D. N. Payne, Gain-shaped Erbium-doped Fiber Amplifier (EDFA) with Broad Spectral Bandwidth, Topical Meeting on Optical Amplifier Application, MDI, 1990.

[2] C. R. Gile, D. J. Giovanni, Dynamic Gain Equalization in Two-stage Fiber Amplifiers, IEEE Photonic Technology Letters, Vol. 2, No. 12, December 1990, pp. 866–868.

[3] K. Inoue, T. Kominato, II. Toba, Tunable Gain Equalization Using a Mach-Zehnder Optical Filter in Multistage Fiber Amplifiers, IEEE Photonics Technology Letters, Vol. 3, No. 8, 1991, pp. 718–720.

[4] F. Su, R. Olshansky, G. Joyce, D. A. Smith, J. E. Baran, Use of Acousto-optic Tunable Filters as Equalizers in WDM Lightwave Systems OFC Proceeding, pp. 203–204, 1992.

[5] D. L. Lee, Chapter 7: Waveguide Fabrication, in Electromagnetic Principles of Integrated Optics, John Wiley and Sons, Inc., N.Y., 1986.

[6] S. M. Sze, VLSI Technology, McGraw-Hill, N.Y., 1988.

[7] D. Lee, Electromagnetic Principles of Integrated Optics, John Wiley and Sons, Inc., N.Y., 1986.

Having thus described our invention what we claim as new and desire to secure as Letters Patent, is:

1. An optical equalizer for equalizing an optical signal having a plurality of wavelengths on an optical fiber, said optical equalizer comprising:

an optical wavelength demultiplexer for demultiplexing said optical signal into a plurality of individual channels, with each of said channels centered at a corresponding one of said wavelengths;

an optical multiplexer;

a plurality of optical connections for connecting output terminals of said demultiplexer to input terminals of said multiplexer; and a plurality of metallic strips, each of said strips being deposited upon a corresponding one of said optical connections, and each of said strips being of a predetermined length such that said optical signal is equalized over said channels at an output terminal of said optical multiplexer.

2. An optical equalizer, as recited in claim 1, wherein said multiplexer, said demultiplexer and said optical connections are monolithically integrated on a silicon substrate.

3. An optical equalizer, as recited in claim 1, wherein said multiplexer, said demultiplexer and said optical connections are monlithically integrated on an indium phosphate substrate.

4. An optical equalizer as recited in claim 1, wherein said multiplexer, said demultiplexer and said optical connections are monolithically integrated on a polymer substrate.

5. An optical equalizer as recited in claim 1, wherein said multiplexer, said demultiplexer and said optical connections are monolithically integrated on a lithium niobate oxide substrate.

6. An optical equalizer for equalizing an optical signal having N wavelengths $\lambda_1, \ldots, \lambda_i, \ldots, \lambda_N$, said equalizer comprising:

an optical wavelength demultiplexer for demultiplexing said optical signal in N channels, where each of said channels i is centered at a corresponding one of said wavelengths $\lambda_i$, and with each said channels i having optical signal power $P_i$ at the output of said wavelength demultiplexer;

an optical multiplexer;

an optical connection of length l for each of said channels for connecting an output terminal of said demultiplexer to an input terminal of said multiplexer;

a metallic strip of length $x_i$ deposited on each of said channels i, where the lengths of each of said strips are determined by the following steps: for channel I having the minimum signal power $P_I$, set $x_I$ equal to zero and for each of the other said channels i set $x_i$ equal to $$\frac{P_i - P_I}{\alpha_m - \alpha},$$

where $\alpha_m$ is the attenuation coefficient for that portion of said optical connection having a metallic strip, of said metallic strips, deposited thereon, and where $\alpha$ is the attenuation coefficient for that portion of said optical connection not having metallic strips deposited thereon.

7. An apparatus as recited in claim 6 wherein $l = \max\{X_i | i = 1, \ldots, N\}$.

* * * * *